US012654246B2

(12) United States Patent
Mondada

(10) Patent No.: US 12,654,246 B2
(45) Date of Patent: Jun. 16, 2026

(54) WIRE ELECTRICAL DISCHARGE MACHINE

(71) Applicant: Agie Charmilles SA, Losone (CH)

(72) Inventor: Matteo Mondada, Minusio (CH)

(73) Assignee: Agie Charmilles SA, Losone (CH)

( * ) Notice: Subject to any disclaimer, the term of this patent is extended or adjusted under 35 U.S.C. 154(b) by 760 days.

(21) Appl. No.: 18/084,951

(22) Filed: Dec. 20, 2022

(65) Prior Publication Data

US 2023/0201941 A1    Jun. 29, 2023

(30) Foreign Application Priority Data

Dec. 23, 2021    (EP) .................................... 21217243

(51) Int. Cl.
B23H 7/30 (2006.01)
B23H 5/02 (2006.01)
B23H 7/10 (2006.01)
*B23H 9/10* (2006.01)

(52) U.S. Cl.
CPC ................. B23H 7/30 (2013.01); B23H 5/02 (2013.01); B23H 7/101 (2013.01); B23H 7/105 (2013.01); B23H 7/108 (2013.01); *B23H 9/10* (2013.01)

(58) Field of Classification Search
CPC ... B23H 7/02; B23H 7/30; B23H 5/02; B23H 7/101; B23H 7/105; B23H 7/108; B23H 9/10
USPC ...................................................... 219/69.12
See application file for complete search history.

(56) References Cited

U.S. PATENT DOCUMENTS

| | | | |
|---|---|---|---|
| 10,427,233 B2 | 10/2019 | Ookubo et al. | |
| 2013/0053233 A1* | 2/2013 | Mario ....................... | C03C 8/02 |
| | | | 65/90 |
| 2013/0150999 A1* | 6/2013 | Arakawa ................ | B23H 7/065 |
| | | | 700/162 |
| 2017/0341172 A1* | 11/2017 | Oonishi ............... | B23H 11/003 |
| 2018/0238419 A1* | 8/2018 | Glaser ................. | B23F 23/1237 |

FOREIGN PATENT DOCUMENTS

| | | | | |
|---|---|---|---|---|
| CN | 203817553 U | 9/2014 | | |
| CN | 110842311 A | 2/2020 | | |
| CN | 113478034 A | * 10/2021 | ............. | B23H 11/00 |
| KR | 2013-0053233 A | 5/2013 | | |
| WO | 2018-227316 A1 | 12/2018 | | |

OTHER PUBLICATIONS

CN-113478034-A English translation (Year: 2021).*
CN-110842311-A English translation (Year: 2020).*
WO-2018227316 English translation (Year: 2018).*
Extended European Search Report for corresponding Application No. 21217243.1 dated Jun. 24, 2022 (7 Pages).
Klocke, F. et al., (2012) "Developments in Wire-EDM for the Manufacturing of Fir Tree Slots in Turbine Discs Made of Inconel 718", Key Engineering Materials, 504-506, 1177-1182. https://doi.org/10.4028/www.scientific.net/KEM.504-506.1177. **NOTE: The relevancy of this document is discussed in this applicant's specification.

* cited by examiner

*Primary Examiner* — Chris Q Liu
(74) *Attorney, Agent, or Firm* — Harness, Dickey & Pierce, P.L.C.

(57) ABSTRACT

A wire electrical cutting machine for machining a circular part by a wire electrode.

12 Claims, 7 Drawing Sheets

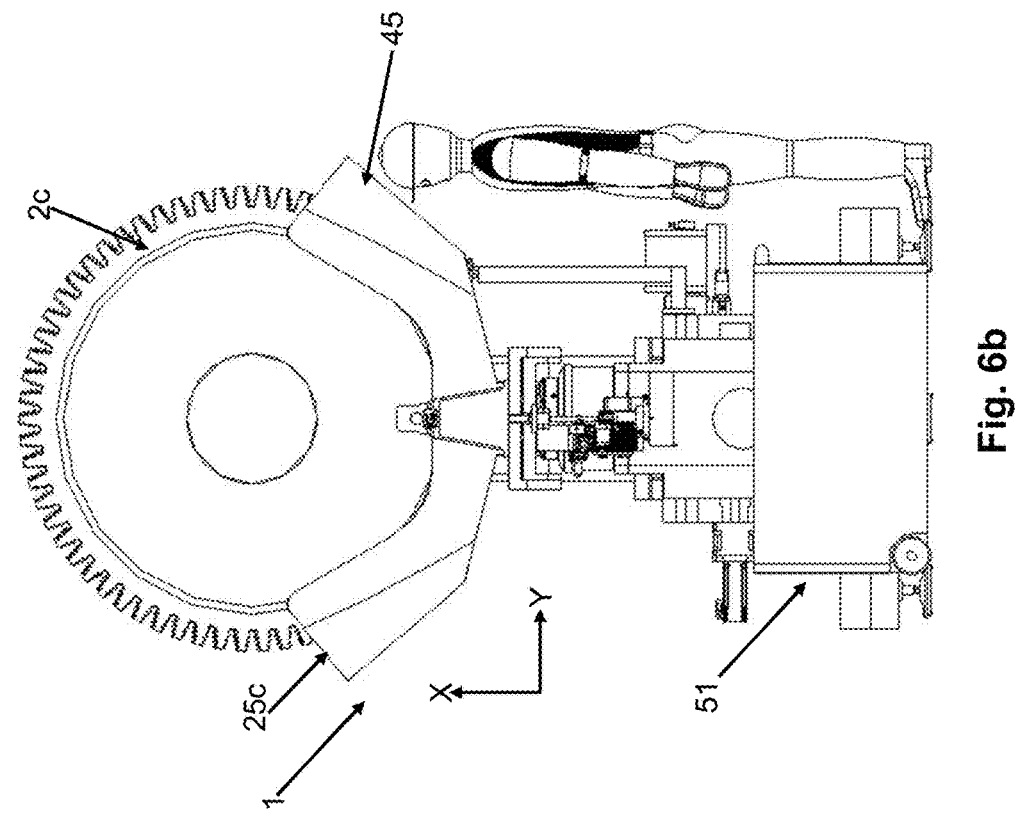
Fig. 6b
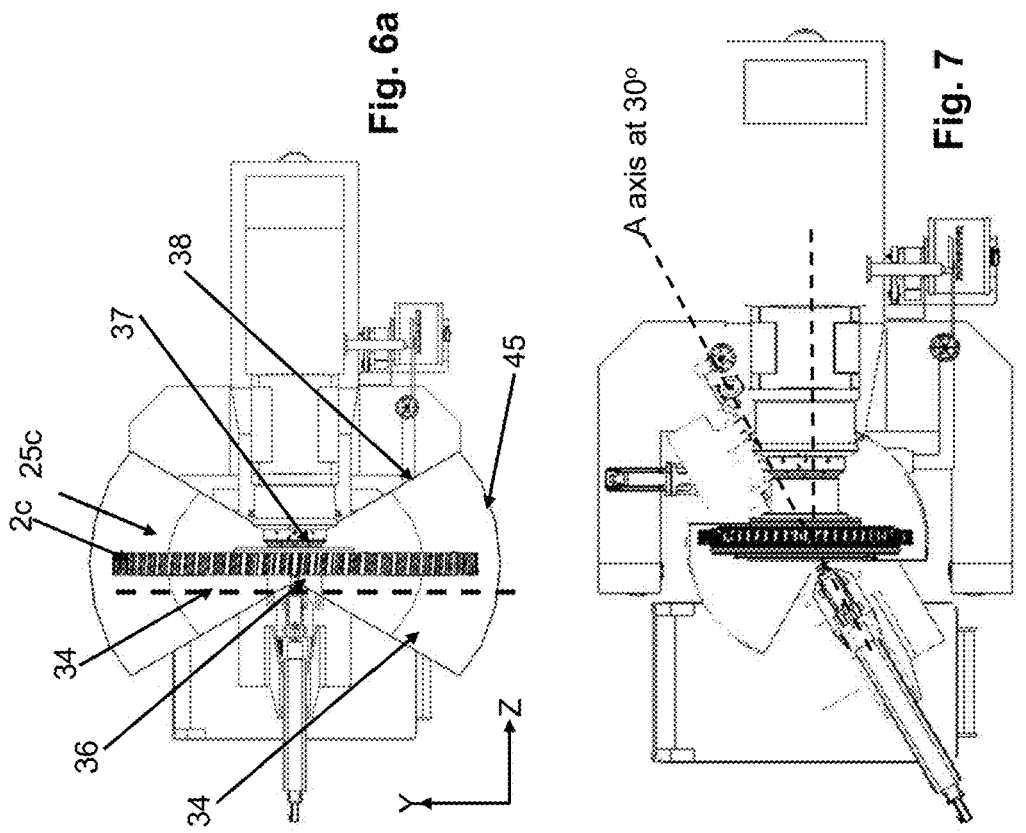
Fig. 6a
Fig. 7

WIRE ELECTRICAL DISCHARGE MACHINE

CROSS-REFERENCE TO RELATED APPLICATIONS

This application claims priority to European Patent Application No. 21 217 243.1 filed Dec. 23, 2021, all of which is incorporated by reference in its entirety.

BACKGROUND OF THE INVENTION

Technical Field

The present invention is related to wire electrical discharge machine (WEDM) for machining a part.

Discussion

The wire electrical discharge machining process (WEDM) is a well-known machining method used to machine parts. It is versatile and extremely accurate. Typically, wire electrical discharge machining uses a wire electrode to cut the metal part. A desired contour is cut in a part by means of the wire electrode. The wire electrode and the part are moved relatively to each other. The process is conducted by applying a pulsed voltage to the gap between the wire electrode and the part to provoke discharges between the work piece and the wire. The material of the part is removed by the discharges occurred between the gap. In this way, a desired contour can be obtained.

In many applications, EDM process replaces more and more the traditional machining process. For example, in the case of manufacturing parts for aerospace and energy sectors. One particular example is the fabrication of blade root slots in turbine discs for aero engines, as discussed in Klocke, F., Welling, D., Dieckmann, J., Veselovac, D., & Perez, R. (2012). Developments in Wire-EDM for the Manufacturing of Fir Tree Slots in Turbine Discs Made of Inconel 718. Key Engineering Materials, 504-506, 1177-1182. https://doi.org/10.4028/www.scientific.net/KEM.504-506.1177. For many years, such part is manufactured by using broaching, milling, or creep feed grinding, in which dedicated tools have to be first manufactured. The tools and the machines are subject to heavy wear and are expensive. Moreover, the adaptation of the process in case of profile modification requires the adaptation of tools. These days, the broaching process has been more and more replaced by the WEDM process to manufacture such parts, since the wire electrode can directly accurately cut the required contour on the turbine discs, and more economically. The WEDM process is more flexible and adaptable, as no corresponding tools are required. The same wire can cut any desired contour. Only the machining path must be reprogrammed and the processing parameters must be adapted to the specific machining, e.g. part material, cutting height, etc.

For example, the machine Agie Charmilles CUT200 dedicated has been brought into the market for several years to machine such blade root slots in the turbine discs using WEDM (youtube.com/watch?v=MsguX3YsaZM). In substance, this machine uses the kinematics of an existing wire electrical discharge machine, with the necessary adaptations for the specific application case. In particular, the machine bed was enlarged and the table was replaced with a swiveling unit bearing a rotational unit. The disc axis is tilted from a vertical axis, and the wire travels vertically, like in most WEDM machines. To operate in a submerged mode the quantity of deionized water is large, and the dielectric conditioning unit must be commensurate to the volume of water of the work tank. The positioning and orientation of the disc is made by means of the submerged swiveling- and rotational units, which is technically challenging. In summary, this known machine is derived from an universal WEDM, which is suitable but not optimized to deal with the specific manufacturing task.

CN110842311 discloses wire electrical discharge machine for machining the turbine discs by wire electrode. It comprises a workpiece positioning unit and an electrode wire traveling circuit. The workpiece positioning unit comprises a translational unit, a first rotating table, a second rotating table, and a workpiece positioning fixture. The workpiece positioning fixture is located on the first rotating table, and the first rotating table rotates around the axis of turbine disk and is positioned on the second rotating table. The second rotating table is rotatably connected to the translational unit, and its rotating axis is located on the horizontal plane. The translational unit comprises an X-axis driving mechanism and a Y-axis driving mechanism, which moves cooperation in the horizontal direction. One of the axis driving mechanisms is assembled and positioned with machine base, and the other axis drive mechanism is assembled and positioned with the second rotating table. The electrode wire traveling circuit comprises a wire unwinding mechanism, an upper- and a lower wire-guiding device and a wire winding mechanism. In this machine, the wire electrode is arranged in the vertical direction for cutting and the axis of the turbine disc can be tilted from a vertical axis to cut the slots at a desired skew angle. The size of the discs, which can be processed, is strongly limited by the size of this machine. The machine is not compatible for machining turbine discs having different diameters.

SUMMARY OF THE INVENTION

It is an aspect of this invention to provide a wire electrical cutting machine, which has a relatively simple design and provides a versatile application. In particular, it is an objective to provide a wire electrical cutting machine to efficiently manufacture a circular part with simple handling. It is a further objective to provide a wire electrical cutting machine, which can machine circular parts having different dimensions.

In the present invention, wire electrical cutting machine for machining a part, in particular a circular part comprises a machine base, a column, a first rotary axis unit, a first linear axis unit, a second linear axis unit and a machine table. The column is fixedly mounted on the machine base. The first rotary axis unit for rotating the part mounted thereon around a first rotary axis is mounted on the column. The first rotary axis is arranged horizontally. The vertical movement of the part is realized by moving the completely first rotary axis unit along the column vertically, thus, the column itself is not driven by any driving mechanism. The first linear axis unit for linear movement of the machine table along a first linear axis is mounted on the machine base. The second linear axis unit for linear movement of the machine table along a second linear axis is mounted on the first linear axis unit. In further, the first linear axis and the second linear axis are arranged orthogonally with respect to each other and orthogonally with respect to the first rotary axis. The machine table bearing a wire traveling circuit is mounted on the second linear axis unit, wherein the wire travelling circuit includes a first wire guiding head and a second wire guiding head and a wire electrode traveling between the first wire guiding head and the second wire guiding head. The first- and the second wire guiding head face each other, on the same axis, coaxially. The wire electrode is positioned below the first rotary axis. In particular, the wire electrode is positioned below the part before the machining. During the machining, the wire electrodes can move upwardly to cut into the part, in particular a lower rim portion of the part according to a designed machining path to obtain a designed contour.

In contrast to the conventional wire electrical discharge machine, in the present invention, the first rotary axis unit mounted on the column serves to support the part and the machine table is provided to span the wire electrode above it through the wire guiding heads mounted on the machine table. This arrangement enables to design a compact machine.

In many applications, the periphery of the part must be cut to obtain a particular feature, this means a contour must be machined at the periphery of the part. Especially, more than one contour must be machined on the periphery of the part. Moreover, the shape of the contour can be identical or even variable. The size and shape of the contour can also vary for one part or between different parts. Additionally, the dimension of the parts can vary in a large range. Thus, the total dimension of the part can be large whereas the size of the contour is comparably small. This means, the area to be machined is small and logically the wire electrode moves in a small area. Nevertheless, a large part requires large space in the machine to be mounted therein, thus, the conventional way of mounting the part on the machine table causes increasing the machine size. The machine of the present invention enables to have a small machining area, in particular have the same machining area for circular parts featuring different sizes. The circular part has a substantially circular shape. However, any parts having at least partially curved shape and suitable to be machined by the machine tool of the present invention are not excluded.

Such circular parts can be for example a turbine disc, a compressor disc, a circular saw disc blade, a grinding wheel, a gear wheel. These circular parts are substantially disc- or ring shaped, and have functional features at their circumference. For instance, a turbine disk may have a rim, with a quantity of fir tree slots on the circumference for the retention of the airfoils. Thus, one particular application of the WEDM machine of the present invention is manufacturing certain turbine components for aerospace or energy segment. The turbine rotor in these areas comprises a plurality of compressor and turbine stages. The stage is formed by a disc with a number of blades at its periphery. Certain of these discs have blades and the turbine disc manufactured separately, with the blades having a root portion and the disc having corresponding slots formed at the rim of the disc to retain the blades. For example, the part is a turbine disc and the periphery of the turbine must be machined to form a multitude of fir tree slots or dovetail slots or otherwise profiled slots for the retention of the blades. The turbine discs depending on the application can have different diameters in the range from 120 mm to 2000 mm. For example, the turbine discs for aerospace application has a diameter of from 300 mm to 1100 mm, typically 500 mm, and the turbine discs for the energy application has a diameter of from 1000 mm to 2000 mm. However, the dimension of the slot to be formed does not vary so much and is typically less than 100 mm×60 mm, for example 30 mm×20 mm. The thickness of a disc is for example 45 mm. The machine of the present invention can be simply adaptable to mount the part having different dimensions without increasing the dimension of the machine. Normally, the part is submerged in a machine liquid during the wire cutting process. When the wire electrode is arranged horizontally, only the portion to be machined is submerged in the machining fluid (dielectric). Logically, it is not necessary to submerge the whole part in the machine fluid as the conventional wire electrical discharge machine. Therefore, a compact WEDM machine covering a large range of parts to be machined can be achieved.

The first rotary axis unit is designed to support the part in consideration of the dimension of the part and the weight of the part. Particularly, in order to provide optimized stable support of the part, the first rotary axis unit is changeable to adapt to the dimension and the weight of the part to be machined. In general, the circular part to be processed is provided with a central bore, an integral shaft, a flange, or other geometric feature by which the part can be precisely, concentrically and rigidly coupled to a matching coupling interface at the first rotary axis unit. Said coupling interface is adapted to the geometric feature of the specific part. In this manner, only few elements of the machine must be changed to adapt the machine to another type of part, and the rest of the machine can be maintained.

The first rotary axis unit is mounted on the column, which enables a good access to the first rotary axis unit from the front for mounting and dismounting it. This solution allows simple adaptation of the machine and therefore enhances the versatility of the machine. The manufacturers can apply the same machine to produce diverse parts.

The adaptation of the machine for machining different size of parts is realized in particular by arranging the first rotary axis unit slidably on the column such that the first rotary axis unit is movable in the vertical direction. By this vertical slider, the first rotary axis respectively the part mounted thereon can be easily repositioned in the vertical direction, if required. To achieve this, the first rotary axis unit is changeably mounted on a slider, which is moveably arranged on the column. The position of the vertical slider is adjusted as a function of the size of the part, such that the lower rim of the part is placed at the desired height for processing by the wire electrode. In general, after setting up and aligning of the part, the vertical slider is not displaced anymore during the entire machining of the circular part. The position of the vertical slider may be set manually, but preferably, the vertical slider axis is a motorized positioning axis that can be used to set the vertical position according to the machining program, but not to perform interpolated motion with other axis. Interpolated motion is required when the e.g. two-dimensional path is important.

Of course, the vertical slide axis can be an interpolation axis, with which it could participate in generating the desired cutting contour, but this is not necessary for the applications envisaged here. In other words, preferably the vertical slider axis is a positioning axis.

The column extends upwardly on the machine base in the vertical direction and can be made in one part with the machine base or in two parts and assembly together. In one preferred variant, the column has a rectangular shape. However, other shapes may be selected to build the column, if the column has at least one surface in the vertical direction, on which the slider can be provided and the surface has a defined height. The column must carry the weight of the part and the first rotary axis unit, therefore it is advantageous that the lower part of the column is wider than the upper part of the column, to enhance the mechanical stability.

In a preferred variant, the height of the column is designed to be sufficient high such that parts having different sizes, in particular the circular parts having different diameters can be machined with the same machine. This enables to adapt the vertical position of the first rotary axis in the vertical direction to adapt to the different sizes of the circular part. During the machining, the first rotary axis is typically maintained at a defined vertical position. Its position may be changed, when the circular part is be mounted on the first rotary axis unit before the machining and/or when the machined part must be removed from the first rotary axis unit after the machining. In order to provide an easy handling, and to reduce the risk of collision in the course of the circular part manipulation, the first rotary axis unit is driven to move upwardly away from the wire electrode. After the part is mounted on the first rotary axis unit, it is driven downwardly to a defined machining position, which is normally defined that the portion of the part to be machined is close to the wire electrode, such that the part is able to engage with the wire electrode for provoking discharges between the part and the wire electrode. In the present invention, the machine is so configured that the part is positioned above the wire electrode before the machining. When the machining is accomplished, e.g., all the slots have been cut, including the one or more trim cut, and where applicable measurements have been executed, the first rotary axis is moved upwardly to dismount the machined part.

The first rotatory unit comprises a shaft for supporting the part thereon, directly or via a coupling interface, and a driving mechanism for driving the shaft to rotate around the first rotary axis, and a rotary encoder to determine accurately the angular position of the first rotary axis. For example, a torque motor can be installed in the first rotatory unit to drive the shaft. The first rotary axis can be C-axis.

The part is positioned or repositioned with respect to the tool by rotation of the first rotatory unit, so that the part can be machined at different angular positions. For example, in the application of the turbine discs, a plurality of fir tree slots must be cut on the periphery of the disc at various angular positions. Thus, after one fir tree slot has been cut, the part is rotated to a next position by means of the first rotatory unit to cut e.g. the neighbored fir tree slot, or another slot, according to the planned machining sequence. The slot is cut one after another and the part is rotated each time until all the slots are accomplished.

The circular part may comprise an angular reference of the part, e.g. a bore at the rim. The absolute angular position of the angular reference is determined, for instance by means of an optical sensor. The first rotary axis unit is rotated to find said angular reference of the part. Once detected, the first rotary axis unit is rotated to the desired initial angular position at which the first slot is cut. The first rotary axis is at rest during the machining of a slot. The first rotary axis is only displaced once the machining of a slot is completed, and the circular part is repositioned to machine the next slot.

Preferably, the first rotary axis is a motorized rotary axis that can be used to set the circular at the desired angular position for the cutting of the slot, according to the machining program, but not to perform interpolated motion with other axis. Of course, the first rotary axis unit can be an interpolation axis, but this is not necessary for the applications envisaged here. In other words, preferably the first rotary axis unit is a positioning axis.

The first linear axis unit and the second linear axis unit serve to drive the translational movement of the machine table, respectively the wire electrode. The first linear axis unit and the second linear axis unit perform interpolated axis motion. The desired contour is cut by the joint movement of the first- and the second linear axis unit, according to the machining program. In the case of the turbine discs processing, each individual slot for the retention of the blades is cut by a combination of the movement of the first- and the second linear axis unit. In one variant, the first linear axis is directed to the vertical direction, such as X direction and the second linear axis is directed to the horizontal direction, like Y direction. However, the direction of the first linear axis and the second linear axis can also be rearranged to a reversed manner. Thus, in another variant, the first linear axis is directed to the horizontal direction, such as Y direction and the second linear axis is directed to the vertical direction, like X direction. In one variant, direct drive is applied for the first linear axis unit and the second linear axis unit.

The stroke of the first- and the second linear axis unit movements for machining are dependent on the size of the desired cutting contour, for example the fir tree profile to be cut, but independent on the overall dimension of the turbine disc. Thus, the axis movements required for machining are comparably small.

The first linear axis unit comprises a first linear guide including a first pair of rail, a linear slider, a first motor and a first scale to measure the position of the linear slider. The first pair of rail is arranged on one side surface of the machine base, in particular this surface is in parallel to the column surface on which the slider is arranged for moving the first rotary axis. The second linear axis unit comprises a second linear guide including a second pair of rail, a second linear slider, a second motor and a second scale to measure the position of the second linear slider. In case of ball-screw drives, a rotary encoder may be used instead or in conjunction with the linear scale. The second pair of the rail is fixed on the first linear slider. The machine table bearing a wire traveling circuit is operationally connected to the second linear axis unit.

In some applications, the wire electrode must be turned to an angle in the horizontal plane to set a cutting angle to cut the required contour on the part to be machined. For instance, in a turbine disc, a specified cutting angle is set by means of the second rotary axis to generate a root profile at a skew angle different from zero. Therefore, in a variant, a second rotary axis unit is provided for rotating the machine table around a second rotary axis, the A axis, which is directed in the vertical direction, perpendicular to the first rotary axis. In this way, the machine table bearing the wire circuit on it can be rotated with respect to the part. Preferably, the second rotary axis unit is arranged between the second linear axis unit and the machine table. The second rotatory unit comprises a shaft, and a driving unit and an angular encoder. The secondary rotary axis unit is directly mounted on the second linear slide, thus it is movable along the first linear axis and the second linear axis. The machine table is supported on the shaft of the second rotary axis to be able to move in the first linear axis and the second linear axis and rotate around the second rotary axis. The cutting angle can be in the range of e.g. −120 to +120 degree, in particular within +/−45 degree. However, certain applications use straight slot geometry, where the cutting angle is 0°. The second rotary axis unit is configured that such large cut angle can be set.

In general, after the setting of the cutting angle, the second rotary axis unit is not displaced anymore during the entire machining of the circular part. The position of the second rotary axis may be set manually, but preferably, it is a motorized rotary axis that can be used to set the cutting angle according to the machining program, but not to perform interpolated motion with other axis. Of course, the second rotary axis unit can be an interpolation axis, but this is not necessary for the applications envisaged here. In other words, preferably the second rotary axis unit is a positioning axis.

The arrangement of the first linear axis unit, the second linear axis unit and the second rotary axis unit can differ from the variant described above. Other arrangement regarding their relative position and the driving mechanism can be applied as long as their translational and rotational movement function can be fulfilled.

In an advantageous variant, the kinematic of the machine is designed in a manner that the part can be positioned by means of the slide mounted at the column at a desired fixed position in the vertical direction, whereby said fixed position is set according to the radius of the part. Moreover, the part can be rotated around the first rotary axis, which is in the horizontal direction. By said rotation, the part is rotated around its own axis, and is brought in the desired angular position, where the part at rest while the slot is being machined. The position of the wire electrode is controlled by means of the first linear axis and the second linear axis, which thus cut the desired slot profile by WEDM cutting. Here the slot profile is formed with the wire axis parallel to the first rotary axis, however the wire can be inclined by rotation around the second rotary axis, which is in the vertical direction. In this way, the slot profile can be cut at a desired skew angle. Preferably, the part is at least during the machining neither movable in the first linear axis nor moveable in the second linear axis. Preferably, at least during the machining the wire electrode is not rotatable around the first rotary axis.

Another advantage is that all axes can be accessed from the front, which is beneficial for the preparation and setup, and the maintenance. For the application of cutting the fir tree slot, the contour is obtained without rotating the part during the machining, which reduces the complexity of the control and improves the machining accuracy.

As mentioned, the horizontal position of the first rotary axis is of advantage to make the machine compact, and the size of the machine is not particularly dependent on the size of the circular part to be processed. A further advantage given by the horizontal orientation of the part in the machine comes into play with the transporting and generally handling the round part. In a vertical position (horizontal axis), a circular part can be conveniently and safely manipulated with a lifting device (crane, forklift truck) and by a handling system such as manipulator, robot, part changing device, autonomous vehicle. Moreover, by the vertical part position, the distance from the center of mass of the part to the bearing point at the machine can be made comparably small.

In addition, the horizontal position of the axis of the circular part results in advantageous automation solutions. In particular, the part can be set up in the WEDM machine by a relatively simple axis-parallel shift and removed after machining in the same way.

To ensure the best surface quality of the cut part, the wire electrode is only used once for cutting. Thus, during the machining the wire electrode moves only in one direction, as is it is usual with WEDM machines.

The present invention is described in particular for a wire electrical discharge process. However, in principle, the machine kinematics described herein can also be used advantageously with other electric wire cutting processes, such as electrical chemical machining, in particular with a Fastwire process. Fastwire machines are also wire electrical cutting machines, but have the wire electrode traveling back and forth bidirectionally, at high speed, different machining fluid and different machining pulses. For instance, the fastwire principle could be used for certain applications in which the geometric tolerances are less stringent. Moreover, the contours to be cut into the circular part are typically open contours, which are accessed from the periphery of the circular part. This type of task suits the fastwire machines very well, as no threading is necessary. While the invention is intended in particular for traditional wire electrical discharge machines, it can be also used with fastwire machines. Some adjustments are necessary, but most of these will be obvious to the specialist.

In general, before the actual machining, a machining path is defined in accordance with the desired cutting contour. The electrical discharge machine comprises a control unit. The machining path of a desired contour is programmed and input into the control unit to control the corresponding axes to perform the required movement. The control unit can access a local or remote catalogue of profiles, e.g. a number of predefined fir tree profiles. The control unit is configured to control the relative position of the wire electrode with respect to the part to be machined to obtain the desired cutting contour. To process an individual feature (e.g. a slot), the circular part is translated into the desired height position by means of the slide carrying the first axis of rotation, and the machine table with the wire circuit on it is rotated to the desired cutting angle by means of the second axis of rotation. Then, the circular part is rotated to the desired angular position. I.e. the start point of the machining of the individual slot, by means of the first axis of rotation.

In the course of the machining of a single slot, the part is resting at the set position in height, at the set cutting angle and at the set angular position of the circular part, while the contour is cut by moving the first- and the second linear axis unit according to the programmed machining path. For the main application envisaged herein, the wire electrical cutting machine comprises:

a vertical slider bearing the first rotary axis, a first rotary axis unit, and a second rotary axis unit; these units being so called positioning axes, which are used to place the circular part and the wire electrode in a well-defined position with respect to each other, in view of wire electrical cutting;

a first linear axis unit and a second linear axis unit, for linear movement of the machine table in two axis directions which are mutually orthogonal and orthogonal to the traveling wire electrode; these units being so called interpolated axes, which are used to to cut the contour according to the defined tool path.

In the application of cutting the fir tree slot on the turbine discs, the axes movements are, for example controlled in a manner described subsequently:

The WEDM process starts at the periphery of the discs and cut into the radial direction of the disc to a defined position and moves again toward to the periphery. The first linear axis and the second axis can be considered as the erosion axes because the combined movement of these two axes contribute to move the wire electrode along the defined machining path.

In the case of application of cutting the fir tree slots, the wire electrode cut the turbine discs along the programmed machining path cut the slot one by one. The portion of the part, which is cut out stays in the part during the machining of the next slot. When all the slots are cut out, all the cut-out respectively the slug will be removed. Therefore, the machine of the present invention features an optimal slug management, as the slugs can be removed at the outside of the machine area, namely the wet arear. Moreover, the slugs can be extracted in a controlled manner, because the slugs do not fall arbitrarily during the machining into the worktank.

In a preferred variant, the machine table is configured to be inclinable around a horizontal swivel axis, for example the B-axis. The swivel axis (B-axis) is substantially orthogonal to the first rotary axis and substantially orthogonal to the second rotary axis (A-axis). The swivel axis is for the alignment, such as adjustment of the parallelism of the wire electrode longitudinal axis and the horizontal first rotary axis of the workpiece. The adjusting angle is small, so that the adjusting unit may also be constituted by a flexible mechanical structure, for example a flexural stage.

In one embodiment, the machine table bears a work tank for receiving a machining fluid. In particular, the machining process is accomplished in the machining fluid.

In an advantageous variant, the work tank is removable. The work tank can be easily dismounted and mounted for setup and maintenance purpose. Additionally, when the part having different sizes are machined, the work tanks having different sizes and/or shapes can be installed, depending of e.g. the size of the part to be processed, to optimize the submerge of the portion of the part to be machined.

In further, the work tank has a bottom surface, at least two side surfaces, a front surface and a back surface. The shape and/or size of the work tank is optimized to adapt the shape and/or size of the part to be machined and/or to ensure the safe relative movement of the work tank with respect to the part. For this purpose, the work tank has two convex side surfaces extending upwards for receiving a portion of the part. In this way, the table can be rotated, with no interference between the part and the work tank. The wire electrode travels into the front surface and out of the back surface of the work tank to be able to engage with the portion of the part submerged in the machine fluid received in the work tank. In a preferred variant, the front surface and back surface have a concave shape to reduce the wire length travelling through the work tank. The bottom surface may be curved to be tailored to the shape of the part, for example, the circular shape of the turbine discs. However, other shapes of work tank are also possible, for example, bathtube shape, and cubic shape. Moreover, the work tank can be composed of a plurality of parts, so that it can be easily assembled and disassembled, even if the part is already in place for processing. Further, a part of the tank may be fixedly mounted with the wire guiding head, and the work tank is formed by assembling side portions to the one or more fixed portion. Small leakage may be permitted and collected by means of a collecting channel around the table.

The first wire guiding head is positioned closely to the front surface of the work tank and the second wire guiding head is positioned closely to the back surface of the work tank. Both wire guiding heads are mounted on the machine table facing each other. In this way, the flushing is always coaxial to the wire electrode, which ensures an optimal flushing of the cutting kerf, also with skewed slots. The wire guiding heads include a flushing nozzle. In general, it is of advantage to minimize the distance between the flushing nozzles and the surface of the part, for optimal flushing. Thus, the nozzle and/or the wire guiding head may penetrate the work tank. The position of the first wire guiding head and/or the second can be adjusted to change the distance between the part and the nozzles of the wire guiding heads. The distance between the nozzle of the first wire guiding head and the nozzle of the second wire guiding head is at least larger than the thickness of the part, in particular the thickness of the turbine discs.

According to an embodiment of the invention, the slug is removed directly after the main cut, by displacing one or both of the linear axis units Y, Z so that the loose slug can be removed from the slot by an axial pulling or pushing movement. For instance, when the main cut is finished the work tank is drained and the linear axis units Y, Z are displaced to provide free access to the slug. For example, the stroke of e.g. the X linear axis unit is made 100 mm longer than required for the cutting of the fir tree slot, so that the slug (cut-out piece) can be exposed by moving the X slide downwards. In this way, the positioning axes, which may be less precise than the sevo-controlled axes, do not need to be displaced (in particular, the first rotary axis and/or the slider bearing the first rotary axis may be a positioning axis). Position errors are avoided. A robotic device (not shown) comprising a receptacle and a suction device as end effector is positioned coaxially against the loose slug. Then, the slug is extracted by the action of the suction device in cooperation with a retracting movement of the robotic device. Once the slug is entirely extracted, it drops into the receptacle, which is also fixed to the robotic device, under the suction device. The slug is moved to a basket outside of the work tank. The tank is filled with dielectric fluid and the machining is resumed by executing the trim cut. Once the slot is entirely machined, the disk is rotated to the next position by means of the first rotary axis unit.

According to another embodiment, the main cut of a plurality or all slot is executed before the trim cutting of these slots. Normally, in order to obtain a sufficient surface quality, one maincut and more than one trimcuts, e.g. 3 to 4 trimcuts are required. The slugs are left in place while the circular part is rotated to the next angular position, and the plurality or all slot are machined. A slug is removed as soon as the part has rotated at least enough that the slug extraction is not hindered by the wire traveling circuit and by the movement of the first- and the second linear axis.

For instance, a piston for the extraction of the slug is mounted above the worktank, together with a receptacle for the slugs. The position and angle of the piston is adjustable to match with the particular circular part, i.e. diameter, angular position of the circular parts, and cutting angle, so that the piston is aligned with the slug for extraction. The piston is operated, e.g. when the first rotary axis has been repositioned for the machining of the next slug. Here, the trim cut is executed after the extraction of a plurality of slugs.

A wire spool is provided and mounted for example on the machine base. The wire is guided from the wire spool by several guide rollers mounted e.g. on the column, at the intermediate Y-slide, and on the table. The rollers are mounted such as to ensure safe wire guidance from the stationary machine base to the machine table. The wire circuit is easy accessible from the front.

The wire electrode used in the machine of the present invention can be conventional wire electrode such as standard brass wire, or a Nickel coated wire for minimal surface contamination.

In one embodiment, the machine table bears a touch probe for measuring the part. This enables to measure the position of the part, e.g. before the machining to check the alignment of the part with the machine axis, to adjust the position of the wire guiding heads, etc. Moreover, the touch probe can be used for inspecting the machined part after the processing.

As mentioned in the previous, in a WEDM process the wire electrode is used only once for cutting the part and the used wire is typically cut into small pieces for recycling. Thus, a wire chopper unit is mounted below the machine table. A container is moveably installed below the wire chopper unit for receiving the used wire.

In one preferred variant, the wire electrical cutting machine is a wire electrical discharge machine and the wire electrode travels unidirectionally from the first wire guiding head to the second wire guiding head.

In another preferred variant, the wire electrical cutting machine is a fast wire electrical discharge machine and the wire electrode travels bi-directionally between the first wire guiding head and the second wire guiding head. In this variant of the invention, the arrangement of the axes and the position of the wire in relation to the workpiece remains the same. The main visible difference with respect to the WEDM lays in the wire traveling circuit, which in case of fastwire machines travels back- and forth alternatively, at high speed. The fresh wire spool is replaced by a wire drum, which stores a limited quantity of molybdenum wire (e.g. 400 m), which is used thousands of times before its replacement. Preferably—in case of single drum fastwire machines, in which one drum serves to unwind and to wind-up the wire electrode—this wire drum is mounted at the second linear axis unit or directly at the machine table. This, because the length of the wire circuit of a fastwire machine with a single drum is substantially fixed. By mounting the drum e.g. at the second linear axis unit the dturn is resting with respect to the table. The second rotary axis is typically preset and fixed for a given machining. The wire chopper is not present here.

BRIEF DESCRIPTION OF THE DRAWINGS

A more particular description of the principles briefly described above will be rendered in the following by reference to specific embodiments thereof, which are illustrated in the drawings. These drawings illustrate exemplary embodiments of the disclosure and are not therefore to be considered to limit its scope. The principles of the disclosure are described and explained with details through the use of the accompanying drawings in which:

FIGS. 6*a* and 6*b* illustrate the top view and the lateral view of the machine;

FIG. 7 illustrates a top view of the machine with a rotation angle of the second rotary axis.

DESCRIPTION OF THE PREFERRED EMBODIMENTS

Figures 1A, 1B, 2A, 2B:
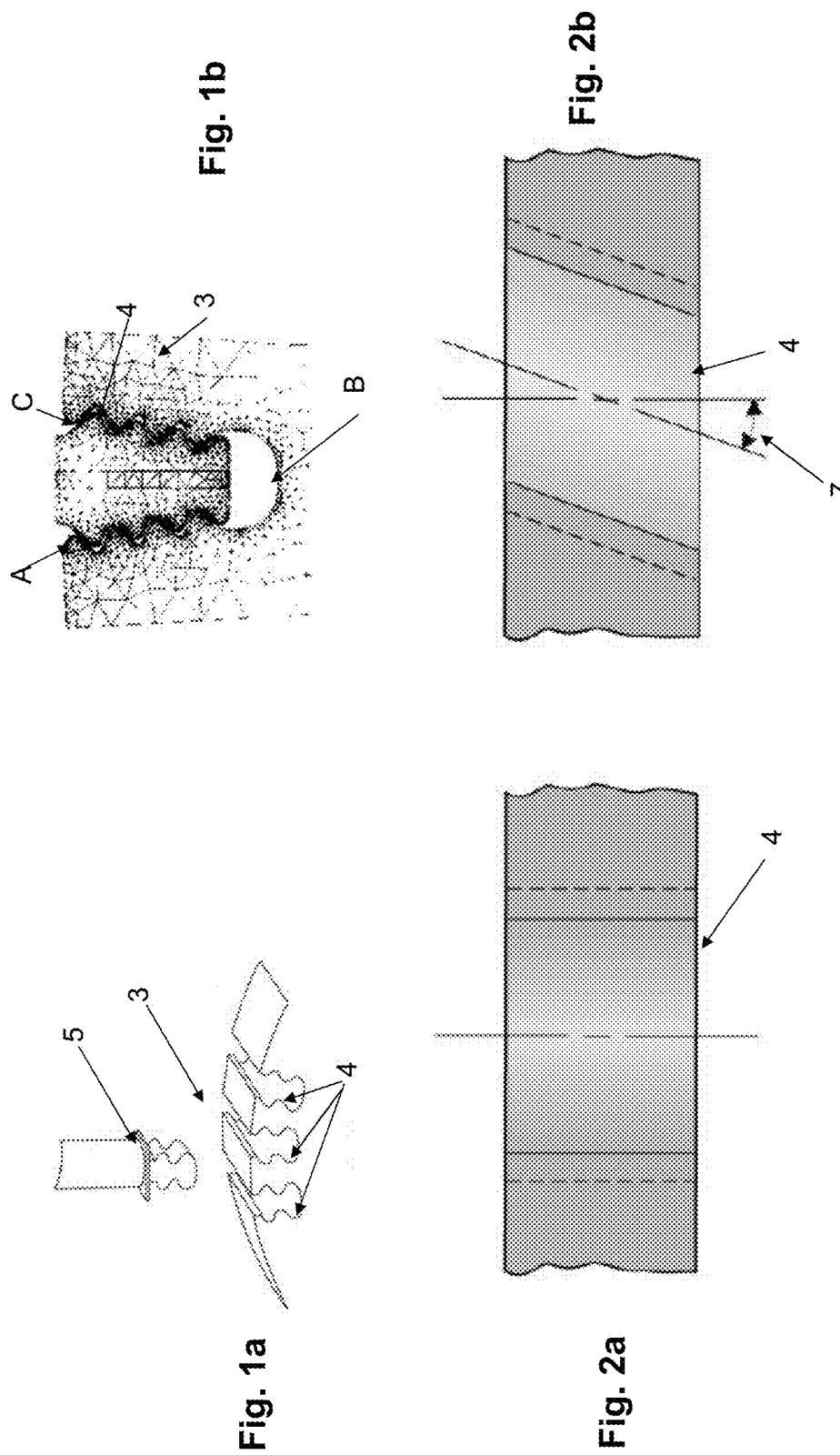
FIGS. 1*a* and 1*b* illustrate one example of the assembled part.
FIGS. 2*a* and 2*b* illustrate a cross-section of the contour to be cut.
Figures 5A, 5B, 5C:
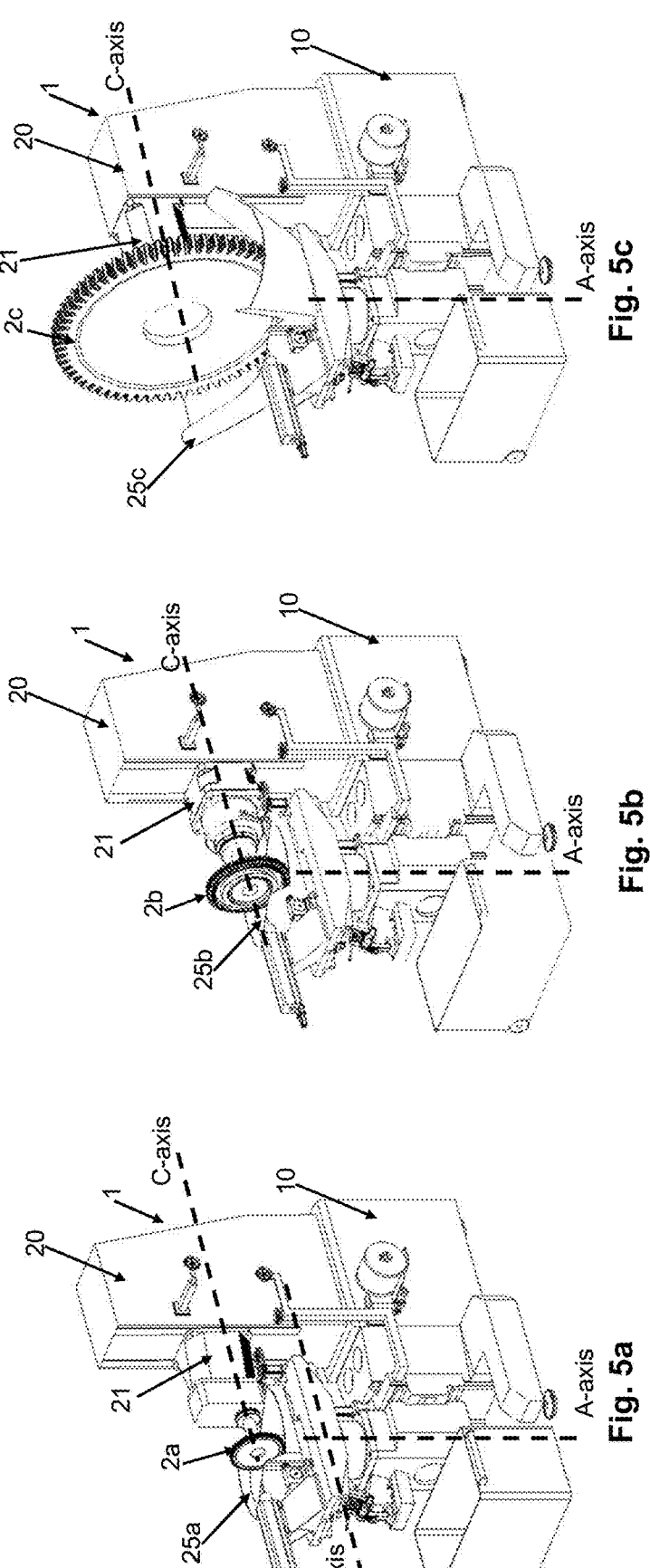
FIGS. 5*a*, 5*b*, and 5*c* illustrate the machine for machining parts having different dimensions.

FIG. 1*a* shows an example of an assembled part, namely a turbine disc 3 with a plurality of blades 5 fixed thereon. In FIG. 5*a* only one blade is shown. Each blade is inserted into a fir tree slot 4, which can also been seen in FIG. 1*b* in an enlarged view. The root of the blade is manufactured separately, by for example milling, using fir tree form cutter tools. In order to assemble the plurality of blades on the disc, a plurality of fir tree slots must be machined accurately for receiving the blades. FIG. 1*b* shows in particular the connection region of the blade in the fir tree slot of the turbine disc machined by the WEDM machine of the present invention. The root portion of the blade and the fir tree slot of the disk have optimized profiles, such that in operation the blade can optimally transmit the forces to the disk.

Figure 3:
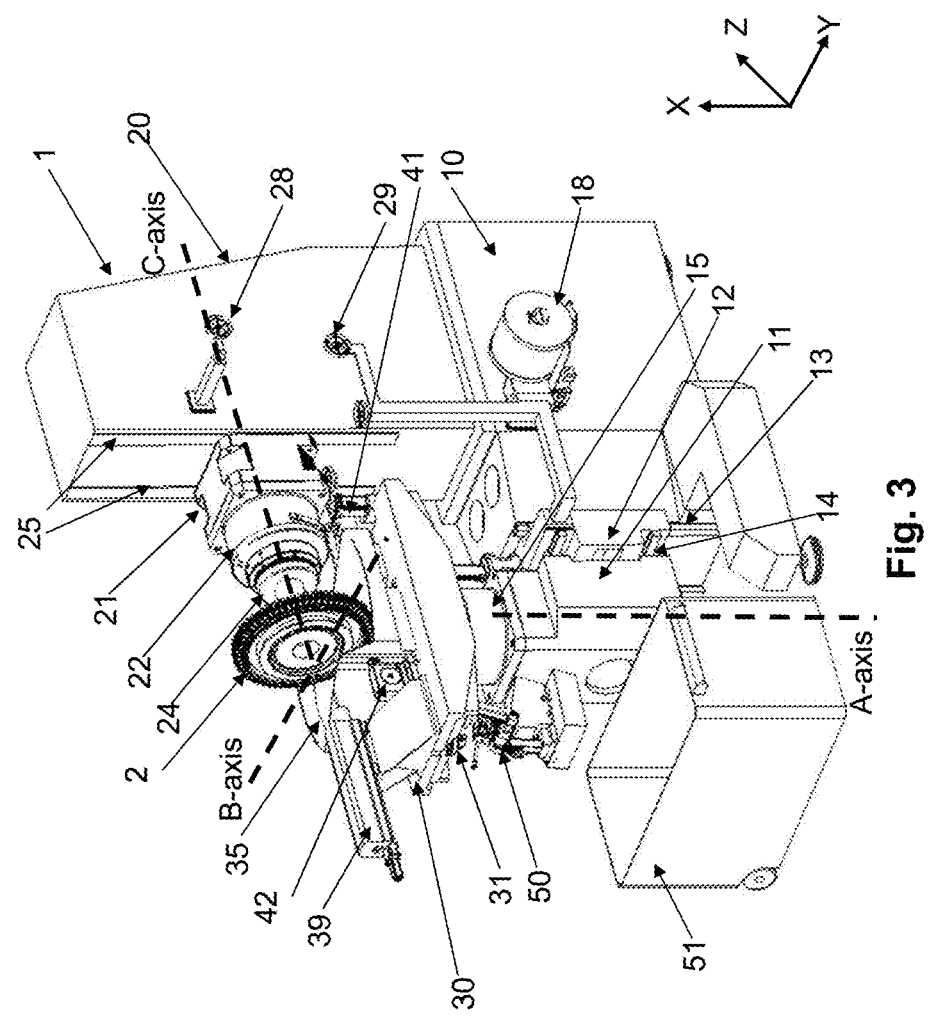
FIG. 3 illustrates three-dimensional view of the wire electrical discharge machine.

FIG. 3 illustrates a three-dimensional view of the wire electrical cutting machine 1 having a part 2 mounted thereon, for example a turbine disc. The machine comprises a machine base 10, a column 20 standing on the top surface of the base. On one side surface of the column, guiding rails 25 extending on the vertical direction are provided to receive a slider 21 thereon. The slider can be driven to move in the vertical direction on the guiding rails to adjust the position of a first rotary axis unit and the part. The first rotary axis unit is mounted on the slider to rotate the part around the first rotary axis for example the C-axis. In particular, the C-axis is oriented in the horizontal direction and perpendicular to the side surface of the column, on which the guiding rails are mounted. The part to be machined usually features a hole, a shaft, a flange, or other geometric reference, through which the part can be mounted on the shaft 24 of the rotating C-axis. The FIG. 3 shows the position of the slider when the part is machined, thus the part is positioned in the proximity of the wire electrode and above it. For mounting the part, the slider is preferably moved upwards to a position, which is higher than the current position shown in the figure to ensure an easy handling. On each turbine disc, many fir tree slots must be formed at the whole periphery, thus, the part must be able to be rotated between the machining of each of the fir tree slot. During the machining, the part is preferably not rotated.

The wire electrical cutting machine further comprises a machine table 30, which is movable in the vertical direction and in the horizontal direction. In the FIG. 3, the vertical direction is indicated as the X direction, and the horizontal direction is indicated as the Y direction. In a home machine position (at zero skew angle), both, the vertical direction X and the horizontal direction Y are orthogonal to the longitudinal axis of the wire electrode, and the longitudinal axis of the wire electrode is parallel to the Z direction. To achieve these movements, a first linear axis unit 12 and a second linear axis unit 11 are provided and operationally connected between the machine base bearing the part and the machine table bearing the tool (wire). A first pair of linear guides 13 is vertically mounted on the base 10. The first linear axis unit 12 is a cross-slide, which is movable in a vertical direction. It is guided by said first pair of linear guides 13. On the opposite surface of the first linear axis unit 12 (the cross-slide), a second pair of linear guides 14 is mounted horizontally. The second linear axis unit 11, which is movable in the horizontal direction, is guided by said second linear guide pair 14. Preferably, the machine base has a rectangular shape having a top surface, a bottom surface and several side surfaces. The column is mounted on the top surface of the machine base and the first pair of the linear guides 13 is mounted on one side surface of the machine base.

In this example, a second rotary axis unit is additionally provided to enable a rotation of the machine table within a defined rotation angle around the second rotary axis. This second rotary axis may serve, e.g. to set a desired skew angle (see FIG. 7), in which the machine table (and the wire traveling circuit) is positioned by means of the A-axis for the cutting process. As shown in FIGS. 2*a* and 2*b*, the specification regarding to skew angle can vary from part to part. FIG. 2*a* shows one profile to be cut having zero skew angle and FIG. 2*b* shows another profile to be cut having a defined skew angle. It is rare case but not excluded that profiles having different skew angles must be cut in one part. FIG. 3 shows the example in which the second rotary axis A is the rotation around the X-axis, which is directed in the vertical direction. The A-rotating axis is oriented in the vertical direction and perpendicular to the C-rotating axis. Especially, the FIG. 3 shows the embodiment, in which the second rotary axis unit 15 (A-axis unit) is positioned below the machine table 30 and arranged on top of the second linear axis unit 11. In further, a work tank 35 is mounted on the top surface of the machine table for receiving the machining fluid, since the machining is conducted in the machining fluid, preferably in submerged operation.

Moreover, a wire circuit 40 is included in the WEDM machine to supply, guide, and transport and lastly dispose the wire electrode. During the machining, the wire electrode travels in longitudinal direction so that it is continuously renewed. Further, the wire electrode is moved with respect to the part, in particular to the lower rim portion of the part by means of the X- and Y-axis linear units. The wire electrode is oriented horizontally. A wire spool 18 is mounted on the machine base in the example shown in the figures. However, the wire spool is not limited to this position and can be mounted for example on the column or directly below the worktable. A first wire guiding head 32 and a second wire guiding head 33 are provided and positioned on the machine table, horizontally spaced apart with each other. The wire guiding heads 41, 42 include among others, a first wire guide for precisely guiding the wire electrode, a current feeder for the supply of the machining current to the wire, and a flushing nozzle for guiding the flushing jet. Both wire guiding heads are mounted on the machine table, partially protruding into the work tank and the portion of the wire electrode being engaged with the part during the machining extending inside the tank, between the wire guiding heads. A first through hole 36 and a second through hole 37 are provided on the front surface 34 of the work tank and the back surface 38 of the work tank, respectively. These elements are indicated in the FIG. 6a illustrating the top view of the machine. The wire electrode applied for cutting the part is guided and tensed between the first wire guiding head and the second wire guiding head and travels from the first wire guiding head through the work tank to the second wire guiding head.

The wire electrical cutting machine comprises a pulse generator not shown in the figure to generate and supply the discharge pulses on the wire electrode through two current feeders, which are also not shown in the figure. The electrical discharges between the wire electrode and the part can be provoked by the supplied discharge pulses to remove the material of the part. To be mentioned, that the layout of the machine allows to place the generator very close to the machining process, such that the generator cables can be comparably short. In this way, very short pulses with high current can be generated. For example, a pulse less than 1□s with a current >1000 A can be generated and applied to the wire electrode. Applying such pulses can reduce the while layer. In addition, combining such pulses with particular type of wire electrodes can even increase the productivity.

In some embodiments, the part has ground potential; one pole of the generator is connected to the ground. According to an embodiment of the invention, the part to be processed is contacted, e.g. connected to ground in proximity of the wire guiding head by means of a contacting unit, comprising e.g. a metallic- or carbon brush. By this provision the current loop, which determines the circuit inductance is particularly short, so that the pulses are not distorted significantly. Preferably, in operation a retractable contacting unit is brought in contact with the part. The retractable contacting unit may comprise a rotational- or a translational mechanism, e.g. a telescope, a rotating lever, a scissor mechanism, etc.

At the end of the wire circuit, a wire chopper 50 is provided to cut the used wire electrode for convenient disposal and recycling. For instance, the wire chopper is arranged below the table or directly on the bottom surface of the machine table. In order to receive the chopped wire, a wire container 51 is placed below the machine table such that the chopped wire can directly fall into the wire container.

Figure 4:
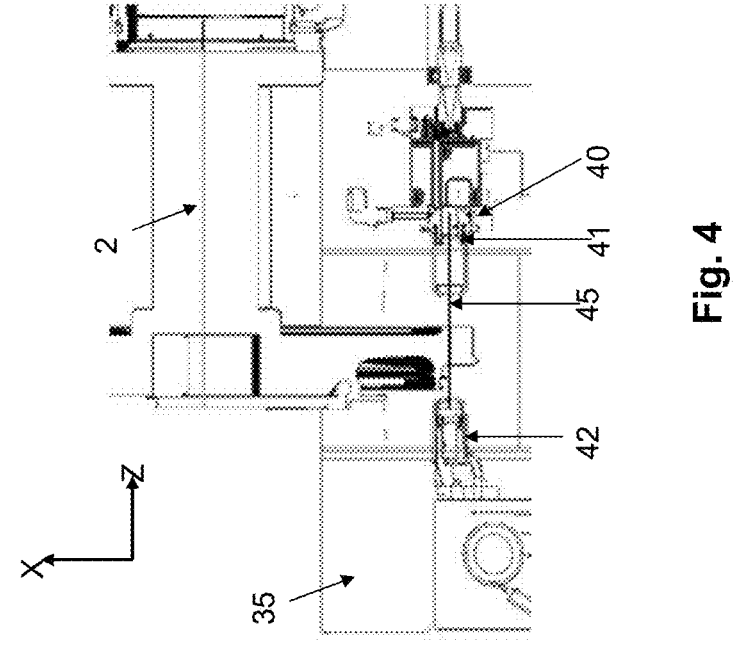
FIG. 4 illustrates a detailed view of the machining area.

FIG. 4 depicts a detailed view of the machining area, in which the wire electrode engages with the portion of the part to be machined. It can be seen that the first rotary axis is in the horizontal direction and the wire electrode is tensed between the first wire guiding head and the second wire guiding head, horizontally. It is a sectional view in the X-Z plane. The wire can be threaded automatically with no difficulty, because the wire guide heads are coaxial with one another, and are located at a limited distance. Moreover, the relevant part of the wire traveling circuit is substantially straight, which is ideal for the wire electrode.

In operation, the lower rim of the circular part to be processed is immerged in the dielectric fluid, so that most of the process heat is evacuated by said dielectric fluid, which in turn is conditioned in a dielectric fluid conditioning unit (not shown). In addition, the regions of the part, which are not submerged, may be sprinkled with the conditioned dielectric fluid, to ensure the thermal stability of the part.

One advantage of the WEDM machine of the present invention is the flexibility and adaptability in view of machining different parts. The machine is designed in a way that parts having different sizes can be machined without changing many elements of the machine. FIGS. 5a, 5b and 5c demonstrate versatility of the machine. Another advantage is the safety since the collision risk can be reduced; in fact, the part is not translated in operation, but only rotated by means of the first rotary axis for the positioning. The machine has free accessibility because it machine can be accessed from the side, front and top. In these three figures, turbine discs as one example of the part to be machined having a small diameter, a middle diameter and a large diameter are mounted on the C-axis. The main adjustment is the vertical position of the C-axis, which can be simply achieved by driving the slider in the vertical direction. As shown in FIG. 5a, a part having a small diameter 2a is to be machined, therefore, the C-axis is positioned vertically at the lower part of the column, close to the machine base. As shown in FIG. 5b, a part having a middle diameter 2b is to be machined, therefore, the C-axis is positioned vertically in the middle part of the column. As shown in FIG. 5c, a part having a large diameter 2c is to be machined, therefore, the C-axis is positioned vertically at the upper part of the column. The part having large diameter can have much more weight than the part having small diameters. In a preferred variant, different first rotary axis unit can be applied to support and rotate the part having different diameters to ensure the mechanical stability.

In these examples, the machine is further optimized by mounting three different work tanks 25a, 25b, and 25c on the machine table to be complementary to the diameter of the part. However, it is not always necessary to change the work tank. It depends on the size of the part. Moreover, the worktank can be simply removed, e.g. for cleaning.

FIGS. 6a and 6b illustrate the top view- and the side view of the wire electrical cutting machine, respectively. Here, a part having a large diameter is mounted in the machine, correspondingly the large tank 25c is mounted on the machine table. In this example, the tank is designed to a special shape. The side surfaces 45 of the work tank have a convex shape and the front surface 34 and the back surface 38 of the work tank have a concave shape to reduce the distance between the first wire guiding head and the second wire guiding head. The work tank can be made compact and the wet area of the machine is small, since only a relative small portion of the part is submerged in the machine fluid. In case of the turbine discs, the diameter of the disc can be large, but the thickness of the disc remains comparably small and due to the particular arrangement of the part in the machine, the work tank must not be scaled to the large diameter but the thickness of the disc. This leads to a compact work tank and can save the volume of the machine fluid, which can further reduce the costs of the production.

FIG. 7 is also a top view of the machine. However, the machine table is rotated at an angle of for example 30° around the second rotary axis since the fir tree slot has an inclination as seen in FIG. 2b (skew angle).

At the peripheral surface of the disc a multitude of fir tree slots is produced. The WEDM process starts at the circumference of the disk and the slot is cut according to the part program, e.g. as shown in FIG. 1b, starting at point A to C or vice-versa. The main cut (full cut) generates a slug (dropout part), which is generally removed immediately after the main cut, before the execution of the one or more trim cuts.

The linear axis units and the rotary axis units may be different than shown, so long as it is capable of providing the functionality explained herein.

Figures 8A, 8B:
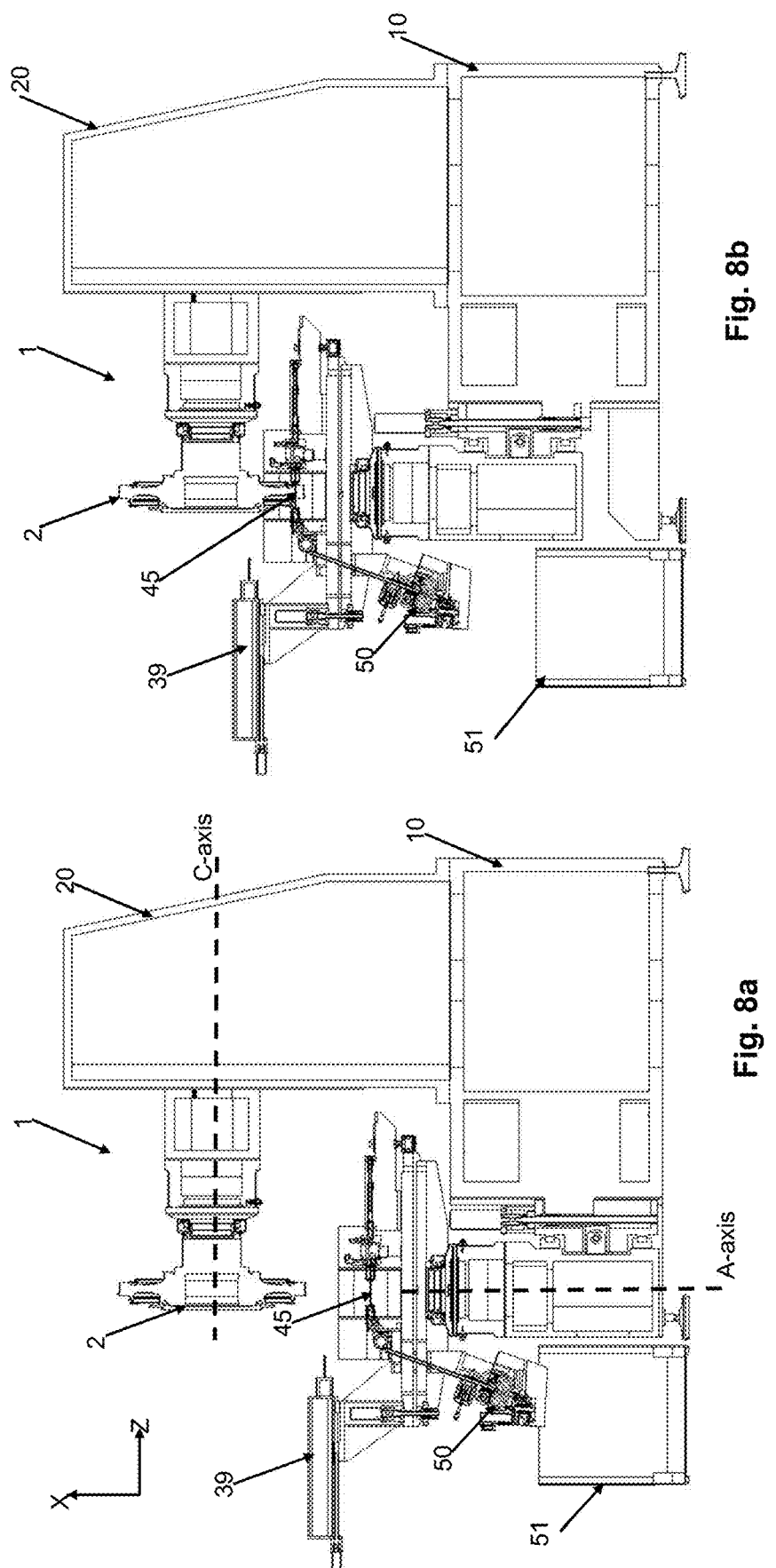
FIGS. 8*a*, 8*b*, 8*c* and 8*d* illustrate the states of the machine.
Figures 8C, 8D:
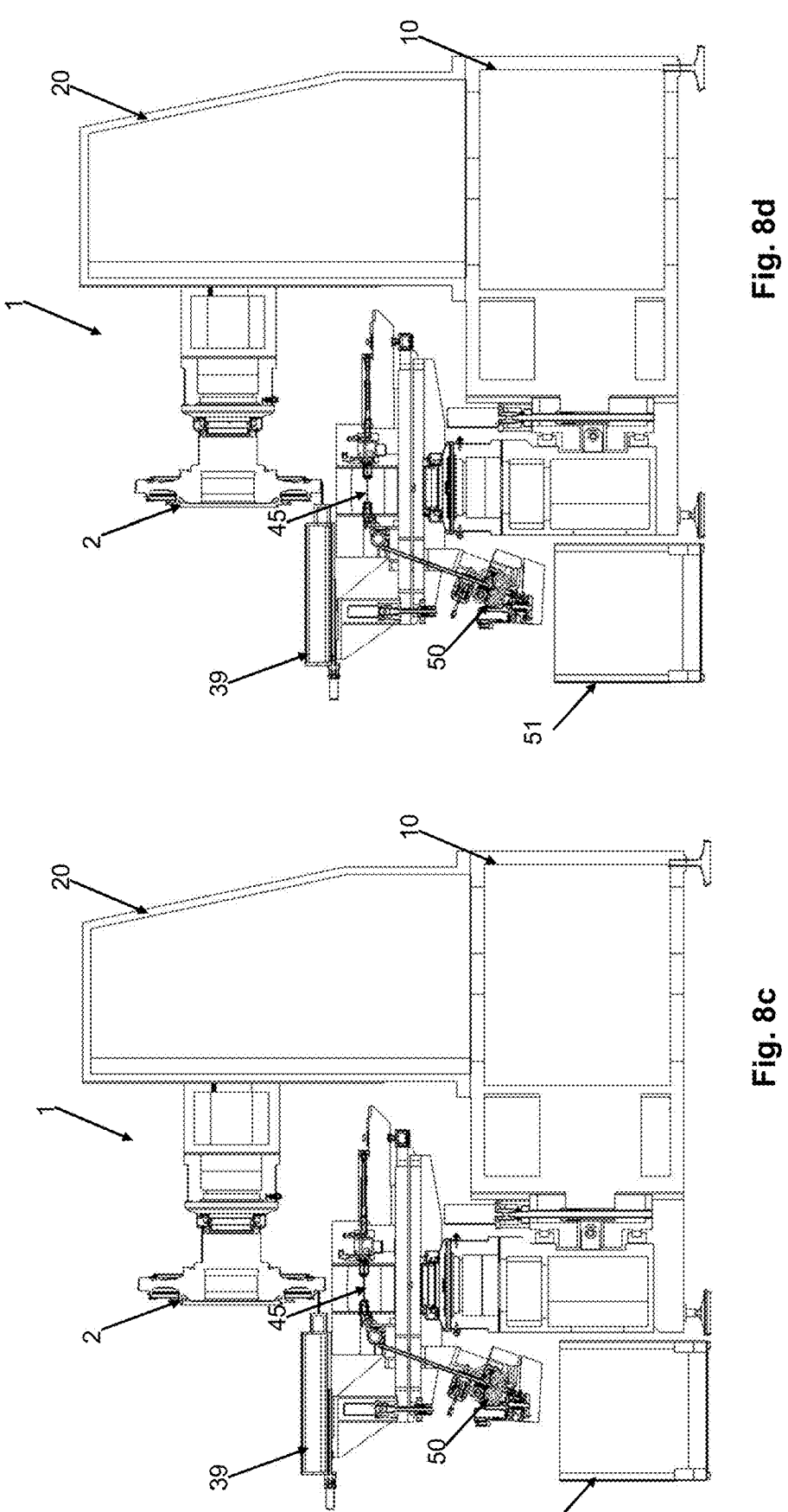

FIGS. 8a, 8b, 8c and 8d depict four different machine states. FIG. 8a shows the state of loading the part, in which the first rotary axis is moved vertically upwards to mount the part thereon. FIG. 8b shows the machining state, in which the first rotary axis is lowed downwardly close to the wire electrode. It also shows the changed position of the machine table in the vertical direction. Since the wire electrodes starts at the peripheral of the discs and cut into the disc, namely upwards in the vertical direction, the machine table must be moved in the vertical direction to raise the vertical position of the wire electrode. The horizontal position, Y direction of the machine table is moved to follow the machine path, which is not shown in the FIG. 8b. The FIGS. 8c and 8d show the measurement state, in which a radial measurement and an axial measurement are conducted respectively. For this purpose, a touch probe 39 shown in FIG. 3 is mounted on the machine table for measuring the radial and axial position of the part.

Figures 9A, 9B:
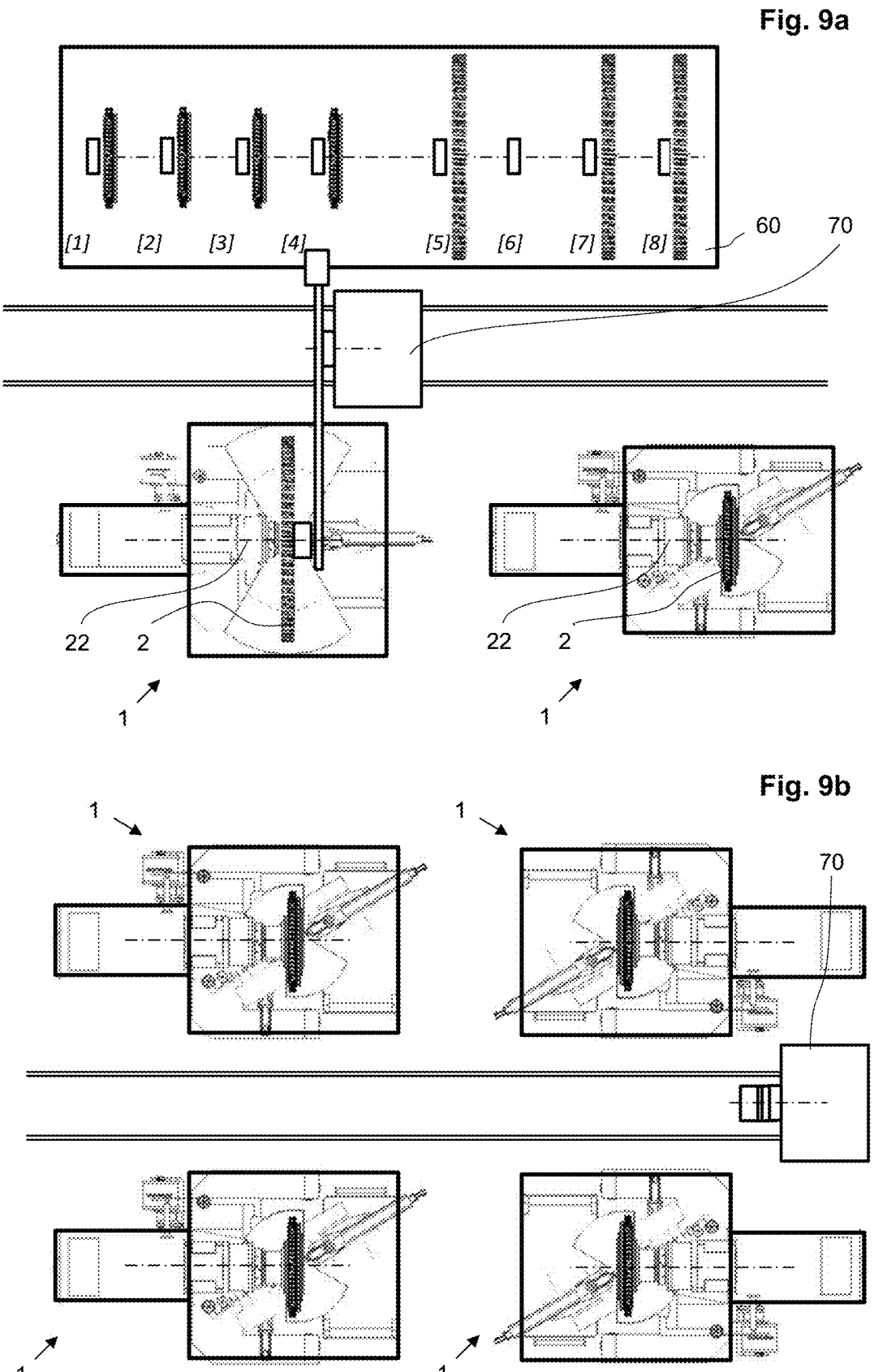
FIGS. 9*a* and 9*b* illustrate automation solutions.

As mentioned, a horizontal position of the axis of the circular part results in advantageous automation solutions. In fact, the part can be set up in the WEDM machine by a relatively simple axis-parallel shift and removed after machining in the same way. FIGS. 9a and 9b illustrates exemplary automation solutions, in which several WEDM machines 1 according to the present invention are lined-up and served by a single handling device 70. The robot is mounted on a slider so that if can be moved alongside of the WEDM's 1. The first rotating axis 22 of the WEDM's 1 and the axis of the circular parts are parallel; the parts are manipulated (e.g. mounted, extracted, stoed) by axis-parallel shift. A robot 70 can pick an unprocessed part from a parts storage, translate to the designated WEDM and load the circular part 2 into the machine for the processing. Advantageously, the part axis orientation is not changed in the course of the entire manipulation. Axially-parallel movements are executed, e.g. to grasp the part from parts depot and to load- and unload the part in the WEDM machine. This provision reduces the required installation space.

The invention claimed is:

1. A wire electrical cutting machine for machining a circular part by a wire electrode, comprising
    a machine base;
    a column mounted on the machine base;
    a first rotary axis unit for rotating the part around a first horizontal rotary axis (C), wherein the first rotary axis unit is mounted on the column;
    a machine table bearing a wire traveling circuit, which includes a first wire guiding head and a second wire guiding head and the wire electrode traveling between the first wire guiding head and the second wire guiding head, in particular in one direction; and
    a first linear axis unit configured for moving the machine table along a first linear axis and a second linear axis unit configured for moving the machine table along a second linear axis, wherein the first linear axis unit is mounted on the machine base and the second linear axis unit is mounted on the first linear axis unit, and the machine table is mounted on the second linear axis unit, wherein the first and the second linear axes are arranged orthogonally with respect to each other and orthogonally with respect to the first rotary axis; wherein at least one of the linear axis units moves vertically; and
    wherein the wire electrode is positioned below the first rotary axis to machine the part.

2. The wire electrical cutting machine according to claim 1, wherein the first rotary axis unit is slidably arranged on the column, wherein the first rotary axis unit is movable in a vertical direction, in particular the first rotary axis unit is mounted on a slider arranged on the column.

3. The wire electrical cutting machine according to claim 1, wherein the wire electrode lies in a horizontal direction, in particular the first wire guiding head and the second wire guiding head are mounted on the machine table facing each other.

4. The wire electrical cutting machine according to claim 1, wherein a second rotary axis unit is provided for rotating the machine table around a second rotary axis, wherein the second rotary axis is arranged in the vertical direction.

5. The wire electrical cutting machine according to claim 4, wherein the second rotary axis unit is arranged between the second linear axis unit and the machine table.

6. The wire electrical cutting machine according to claim 1, wherein the machine table is inclinable around a horizontal swivel axis.

7. The wire electrical cutting machine according to claim 1, wherein the machine table bears a work tank for receiving a machining fluid.

8. The wire electrical cutting machine according to claim 1, wherein a position of the first wire guiding head or the second wire guiding head in wire traveling direction is adjustable.

9. The wire electrical cutting machine according to claim 1, comprising a wire chopper unit being arranged below the machine table.

10. The wire electrical cutting machine according to claim 1, comprising a container being arranged below the wire chopper unit for receiving the electrode wire chopped by the wire chopper unit.

11. The wire electrical cutting machine according to claim 1, wherein the wire electrical cutting machine is a wire electrical discharge machine and the wire electrode travels unidirectionally from the first wire guiding head to the second wire guiding head.

12. The wire electrical cutting machine according to claim 1, wherein the wire electrical cutting machine is a fast wire machine and the wire electrode travels bi-directionally between the first wire guiding head and the second wire guiding head.

\* \* \* \* \*